M. VALENTI.
NUT LOCK.
APPLICATION FILED OCT. 3, 1908.
916,634.
Patented Mar. 30, 1909.
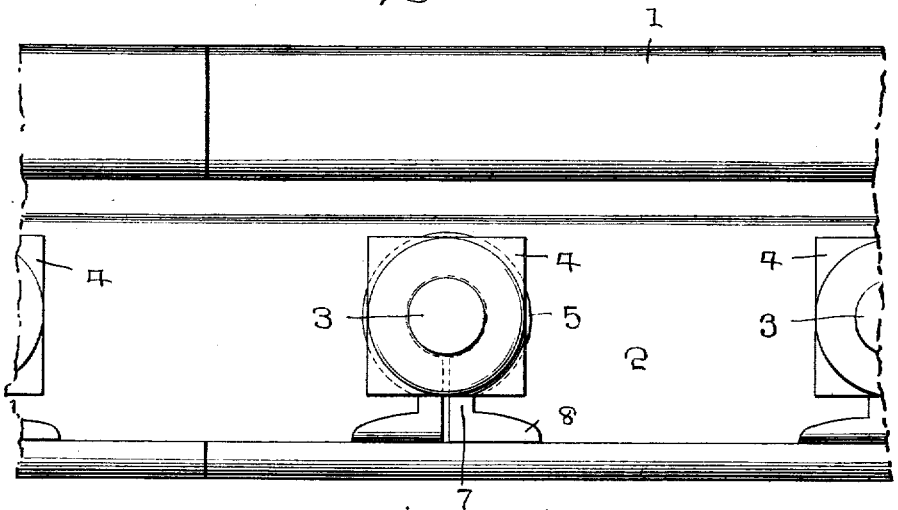
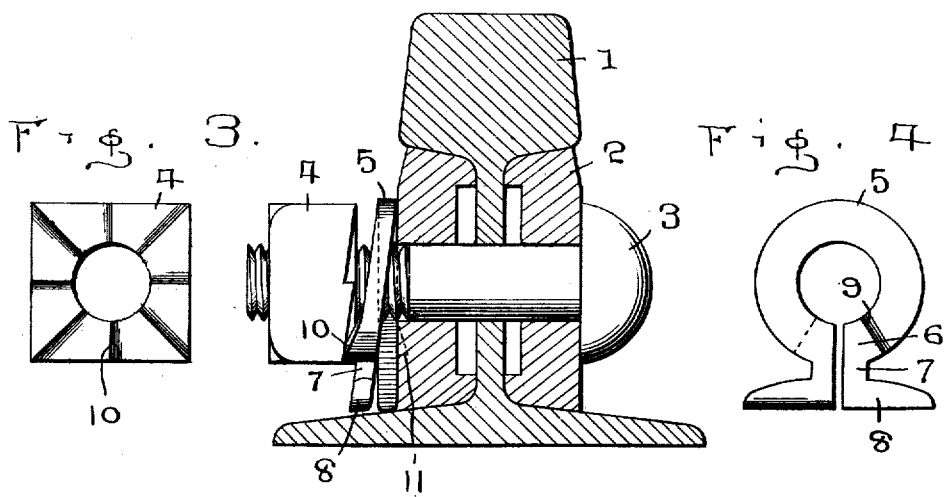
WITNESSES:
INVENTOR
M. Valenti

UNITED STATES PATENT OFFICE.

MICHELE VALENTI, OF WASHINGTON, DISTRICT OF COLUMBIA.

NUT-LOCK.

No. 916,634.      Specification of Letters Patent.      Patented March 30, 1909.

Application filed October 3, 1908. Serial No. 456,008.

*To all whom it may concern:*

Be it known that I, MICHELE VALENTI, a citizen of the United States, residing at Washington, District of Columbia, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks and of that class adapted more particularly to be used for securing fish plates to the ends of track rails and my object is to provide a split washer, the severed ends of which are staggered with relation to each other, whereby said washer will have a spring action on the nut.

A further object is to provide tongues on the parts of the washer to engage shoulders on the face of the nut and a further object is to provide means to prevent rotation of the washer when applied to use.

Other objects and advantages will be hereinafter referred to and more particularly pointed out in the claims.

In the accompanying drawings which are made a part of this application, Figure 1 is an elevation of a section of trackway, showing my improved invention applied to use thereon. Fig. 2 is a transverse sectional view through the track-rail, showing my improved invention in elevation. Fig. 3 is an elevation of the inner face of the nut employed in connection with my improved washer, and, Fig. 4 is an elevation of the washer ready to be applied to use.

Referring to the drawings in which similar reference numerals designate corresponding parts throughout the several views, 1 indicates a track-rail, which may be constructed in the usual or any preferred manner and 2 indicates the usual form of fish plate employed for securing the rails together.

Extending transversely through the fish plates and web of the rail, is a bolt 3, such as is commonly used in railway track construction, one end of the bolt being threaded to receive a nut 4.

Introduced between the nut 4 and the face of the opposed fish plate, is my improved form of washer 5, the split ends 6 of which are bent laterally and rest in a staggered relationship with each other, said split ends also having depending arms 7 at the lower ends of which are formed feet 8, the trend of said feet being at right angles to the trend of the arms.

In order to positively lock the nut 4 in its adjusted position on the bolt 3, the washer 5 is provided adjacent its split ends with ribs 9, the outer faces of which are tapered, and adapted to engage shoulders 10 on the inner face of the nut 4 and by arranging the ribs in the manner shown in Figs. 2 and 4, one of said ribs will always be in position to engage the shoulders on the nut, regardless of which face of the washer is placed outermost and as one of said ribs always extends inwardly, a recess 11 may be formed in the face of the fish plate to receive the rib adjacent the plate.

The ribs 9 are arranged radially on the washer 5, as are also the shoulders 10 on the inner face of the nut, so that said ribs will always be in position to engage the shoulders when the nut is rotated to a certain point and in view of the staggered relation of the split ends of the washer, the spring action of the washer will exert an outward pressure on the rib engaging the nut and positively seat the same in engagement with the shoulders on the nut.

In applying my improved nut lock for use, the fish plates are placed in position and the bolts introduced through the fish plates and interposed portion of the rail, after which the washer is introduced around the projecting end of the bolt and the nut 4 turned on the threaded end of the bolt. As the nut is directed inwardly, the outwardly extending split end 6 will first be engaged by the nut and forced inwardly until it is brought into alinement with the opposite split end or until the outwardly extended end rests against the face of the fish plate and in view of the location of the rib on the outwardly extending end, said rib will be successively snapped over the shoulders 10 and it will be readily seen that when the nut has been turned home on the bolt, the rib 9 will engage one of the shoulders and prevent reverse rotation of the nut, thereby holding the nut in locked position on the bolt.

What I claim is:

1. In a lock nut, the combination with a bolt and a nut adapted to coöperate therewith, said nut having shoulders thereon; of a split washer adapted to be placed between the nut and the object through which the bolt extends, the opposed ends of the washer being bent in opposite directions laterally and provided with ribs having outer tapered surfaces, one of said ribs being adapted to engage shoulders on said nut, said ends also having depending arms and feet at the lower ends of said arms, said feet being adapted to hold the washers against rotation.

2. In a nut lock the combination with a threaded bolt and a nut adapted to engage said bolt, said nut having shoulders on its inner face; of a split washer adapted to surround the bolt between the nut and object through which the bolt extends, the split ends being directed laterally in opposition to each other, said split ends having depending arms and feet at the lower ends of said arms extending at right angles thereto, portions of the surfaces of said washer also having ribs thereon adjacent the split ends one of said ribs being adapted to engage the shoulders on the nut, whereby said nut will be positively locked in position on the bolt.

In testimony whereof I have signed my name to this specification in the presence of two subscribing witnesses.

MICHELE VALENTI.

Witnesses:
W. T. FITZGERALD,
C. E. FETZER.